US00RE42546E

(19) United States
(12) Reissued Patent
Bulow et al.

(10) Patent Number: US RE42,546 E
(45) Date of Reissued Patent: Jul. 12, 2011

(54) METHOD AND SYSTEM FOR TARGET LOCALIZATION

(75) Inventors: Jeffrey Bulow, Syracuse, NY (US); Douglas M. Peters, Pelham, NH (US)

(73) Assignee: Nevada Asset Liquidators, LLC, Las Vegas, NV (US)

(21) Appl. No.: 11/318,398

(22) Filed: Dec. 22, 2005

Related U.S. Patent Documents

Reissue of:
(64) Patent No.: 6,668,218
Issued: Dec. 23, 2003
Appl. No.: 10/108,236
Filed: Mar. 27, 2002

(51) Int. Cl.
*B60L 15/00* (2006.01)

(52) U.S. Cl. ..... 701/21; 701/1; 701/27; 701/36; 701/98; 701/214; 701/301; 701/300; 180/168; 340/436; 342/455; 367/99

(58) Field of Classification Search ..... 701/1, 21, 701/27, 36, 98, 214, 301, 300; 180/168; 340/346; 342/455; 367/99
See application file for complete search history.

(56) References Cited

U.S. PATENT DOCUMENTS

| | | | | |
|---|---|---|---|---|
| 4,148,029 | A | 4/1979 | Quesinberry | |
| 5,067,096 | A | 11/1991 | Olson et al. | |
| 5,095,467 | A | 3/1992 | Olson et al. | |
| 5,248,978 | A | 9/1993 | Manthy et al. | |
| 5,479,360 | A | 12/1995 | Seif et al. | |
| 5,537,368 | A | 7/1996 | O'Brien, Jr. et al. | |
| 5,631,653 | A | 5/1997 | Reedy | |
| 5,675,720 | A | 10/1997 | Sato et al. | |
| 5,732,043 | A | 3/1998 | Nguyen et al. | |
| 5,867,256 | A | 2/1999 | Van Rheeden | |
| 5,933,099 | A | 8/1999 | Mahon | |
| 5,999,117 | A | 12/1999 | Engel | |
| 6,016,453 | A | 1/2000 | Pollock, Jr. et al. | |
| 6,093,923 | A | 7/2000 | Vock et al. | |
| 6,115,700 | A | 9/2000 | Ferkinhoff et al. | |
| 6,125,308 | A * | 9/2000 | Hills et al. | 701/1 |
| 6,133,867 | A | 10/2000 | Eberwine et al. | |
| 6,198,693 | B1 | 3/2001 | Marash | |
| 6,199,471 | B1 | 3/2001 | Perruzzi et al. | |
| 6,215,898 | B1 | 4/2001 | Woodfill et al. | |
| 6,231,002 | B1 | 5/2001 | Hibma et al. | |
| 6,231,003 | B1 | 5/2001 | Hibma et al. | |
| 6,249,241 | B1 | 6/2001 | Jordan et al. | |
| 6,259,974 | B1 * | 7/2001 | Bessacini et al. | 701/1 |
| 6,260,759 | B1 | 7/2001 | Nguyen et al. | |
| 6,275,773 | B1 | 8/2001 | Lemelson et al. | |

(Continued)

OTHER PUBLICATIONS

Wei et al., Estimation of vector miss distnace based on source localization, 2004, IEEE, p. 604-609.*

(Continued)

*Primary Examiner* — Khoi Tran
*Assistant Examiner* — Nikhil Sriraman

(57) ABSTRACT

[The present inventions comprise a] *A* method of estimating a minimum range for a target with respect to a first point of interest, independent of actual[.] range to the target, comprising obtaining three bearing data points; using the three bearing data points to determine a speed contribution $V_{os} \cos(\theta_\beta)$ of a first point of interest to a distance from a relative velocity vector over a time frame comprising $t_0$ to $t_0'$; determining an angle $\theta_\beta$ as defined by the bearing relative to ownship's heading at the point in time of closest approach to a second point of interest; and calculating a minimum range using a predetermined formula.

83 Claims, 4 Drawing Sheets

U.S. PATENT DOCUMENTS

| | | | | |
|---|---|---|---|---|
| 6,487,500 | B2 | 11/2002 | Lemelson et al. | |
| 6,573,486 | B1 * | 6/2003 | Ratkovic et al. | 244/3.2 |
| 6,665,631 | B2 * | 12/2003 | Steinbrecher | 702/159 |
| 6,668,218 | B1 * | 12/2003 | Bulow et al. | 701/21 |
| 6,965,816 | B2 | 11/2005 | Walker | |
| 2003/0093187 | A1 * | 5/2003 | Walker | 701/1 |

OTHER PUBLICATIONS

Price et al., Discarding armture and barrel optimiztion or a cannon caliber electomagnetic laucher system, 1994, IEEE, p. 225230.*

Zielinski et al., Integrated launch package performance in the cannon-caliber launcher, 1997, IEEE, p. 163-168.*

Shukla et al., A powerfulkinematic model for proportionalnavigation of guided weapons against maneuvering targets, 1989, IEEE, p. 194-208.*

Albus, J.S.; "4-D/RCS, A reference model architecture for demo III;" 1997; Internet; http://www.isd.mel.nist.gov/documents/library/isd_pub.html; pp. 1-95.

* cited by examiner

METHOD AND SYSTEM FOR TARGET LOCALIZATION

Matter enclosed in heavy brackets [ ] appears in the original patent but forms no part of this reissue specification; matter printed in italics indicates the additions made by reissue.

FIELD OF THE INVENTION

The present inventions relate to localization of an object or target of interest.

DESCRIPTION OF THE RELATED ART

It is often desirable to track one object from another object to determine if the tracked object will intercept the tracking object, or at what point in time will the tracked object be at it closest approach to the tracking object, sometimes referred to in the art as "Target Motion Analysis." For example, a vessel afloat in the presence of subsea or partially submerged obstacles would need to know where those obstacles are in order to avoid hitting those obstacles. By way of example and not limitation, such systems have been proposed in the art to avoid collisions with other vessels, collisions with such as icebergs, and collisions with submerged objects sufficient to cause damage such as ledges, seamounts, or reefs.

Some of the prior art has proposed using statistically based tracking methods. For example, U.S. Pat. No. 5,732,043 to Nguyen et al. for "Optimized Deterministic Bearings Only Target Motion Analysis Technique" teaches using four target bearings to optimize a target track solution.

In other art, U.S. Pat. No. 6,199,471 issued to Perruzzi, et al. for a "Method And System For Determining The Probable Location Of A Contact" teaches a method and a system for determining a weapon firing strategy for an evading target. Perruzzi '471 comprises the steps of sensing the motion of the target, analyzing the motion of the target, providing a weapon employment decision aid, determining the evasion region for the target using the weapon employment decision aid and the analyzed motion, visually displaying the evasion region, feeding operator knowledge about evading target, and generating a representation of the probability of the location of the evading target.

U.S. Pat. No. 5,867,256 to Van Rheeden for "Passive Range Estimation Using Image Size Measurements" teaches a range estimation system and method which comprises a data base containing data for identification of certain targets and data for estimating the initial range to each of the targets as a function of the observed dimensions of the targets. A sensor (1) observes a scene containing a target a plurality of spaced apart times while the sensor is moving relative to the target to provide data from each observation of the scene relating to the dimensions of the target within the scene. The remaining range to the target is estimated from the observed dimensions of the target from the range traveled since a prior estimation of range and from a prior estimation of the remaining range to the target. The sensor (1) provides electrical signals representing the observed scene (3) and can be a visible light or infrared sensor. A computer (9) is used to identify the target from the data base, estimate the initial range to the target and estimate the remaining range from the range traveled between successive observations of the scene and the change of dimensions of the target in the observed scene.

As noted in the prior art, there are a number of situations where it is desirable to estimate the range to an object of interest or target (e.g. aircraft without the aid of instrument landing systems, automobiles that would be aware of the distance between vehicles to avoid collisions, and missile-based warfare). As also known in the art, active techniques to measure range, such as radar, ladar and sonar, have drawbacks, primarily in military applications, including easy detection by the target under attack. This is true, for example, in submarine warfare where one vessel may want to use sonar to determine the position and velocity of an enemy ship. In such situations, it is advantageous to estimate range to the target passively.

For passive tracking situations, in order to react quickly, tracking methods would preferably fix a boundary on the range to the tracked object quickly while using a minimum amount of data, preferably passive data. Further, it is preferable to calculate the bearing of the tracked object with respect to the tracking object at a point of closest approach, along with calculating a time to that closest approach, independent of other position data.

The AN/SQQ-89(V) UFCS (Navy) surface ship ASW Fire Control System currently uses the Manual Adaptive Target Estimator (MATE) and Maximum Likelihood Estimator (MLE) algorithms to determine target position. These algorithms require substantially more data than the present inventions to obtain their results. The MATE algorithm requires operator based estimates, and systematic manual manipulation of the data to arrive at a position, course and speed estimate of the target. The MLE algorithm also requires limited operator input to arrive at a statistically based estimate of position, course and speed of the target. Both of these algorithms require a substantial amount of data, approximately fifteen to twenty data points, to arrive at a stable solution.

BRIEF DESCRIPTION OF THE DRAWINGS

These and other features, aspects, and advantages of the present inventions will become more fully apparent from the following description, appended claims, and accompanying drawings in which:

DESCRIPTION OF THE PREFERRED EMBODIMENT

Figure 1:
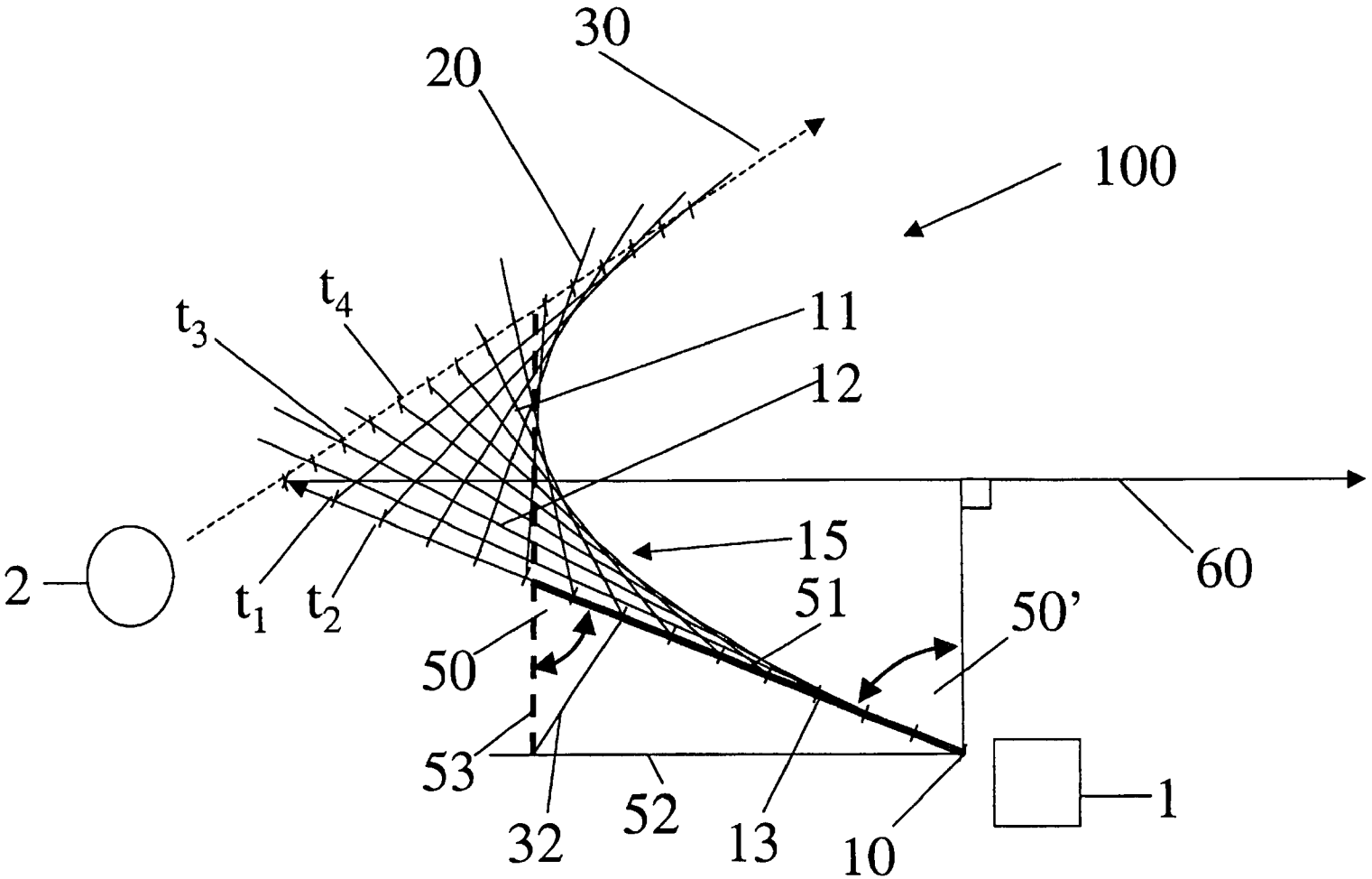
FIG. 1 is an exemplary Cartesian plot of a target, an ownship, and various vectors related to the two, in a geographic reference frame.

Referring to FIG. 1, an exemplary Cartesian plot of a target, an ownship, and various vectors related to the two in a geographic reference frame, the present inventions comprise a method of providing bounds for approximations for tracking an object such as target 2 with respect to a first object such as ownship 1. The present inventions comprise methods for creating calculations useful for bounding tracking sensor localization using a substantially minimum amount of data, in a preferred embodiment especially using passively obtained data as that term is understood by those of ordinary skill in the target detection arts. The methods comprise calculating relative bearing at a closet point of approach ("CPA") and time of CPA independently of other position data, estimating target motion analysis ("TMA") solution noise, and detecting contact maneuvers.

Figure 2:
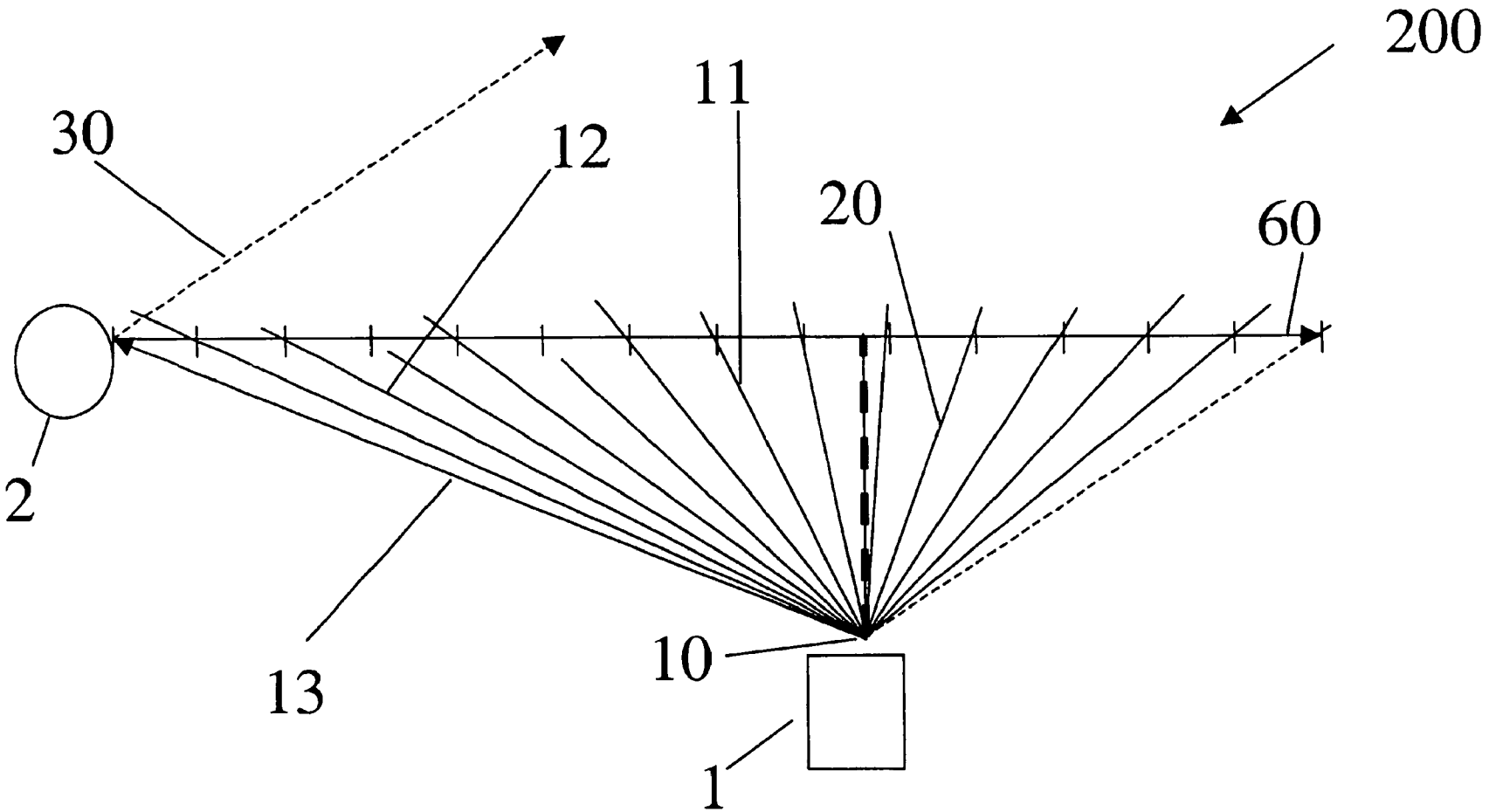
FIG. 2 is an exemplary Cartesian plot of a target, an ownship, and various vectors related to the two, in a reference frame relative to an ownship's position.

In a preferred embodiment, the methods of the present inventions may be used to conduct passive TMA using symmetries associated with two different views of a problem to be solved, e.g. two reference frames and two points of interest. A first of these frames, geographic frame of reference 100, is shown in FIG. 1 and second frame of reference, relative frame of reference 200, is shown in FIG. 2.

As used herein, the "points of interest" include a first physical object such as ownship 1, and a second, target 2, such as second vessel. As further used herein, "ownship" means a first reference point that is not a target, i.e. the vessel making the calculations. Each of these points of interest may be in motion or stationary, and, if in motion, may be in motion in different planes with respect to each other. "Target motion analysis" or TMA means that the course and speed for target 2, which may initially be unknown, are resolved as well as the range to and bearing of target 2 at or for a predetermined time frame with respect to ownship 1. In a preferred embodiment of the present inventions, bearing at CPA, time of CPA, a minimum range to the target with associated course and speed for the minimum range only as a limiting condition, and an initial estimate of the target's true range, course and speed may be determined.

The methods of the present inventions are not limited to surface or subsea water vessels. By way of example and not limitation, target 2 may be another vessel, an iceberg, a submerged object such as a ledge or reef, or the like, assuming that target 2 emits a signal that can be detected by a passive sensor for the passive solution. Further, the methods of the present inventions may be used with partially or fully submerged features such as rocks or debris, floating materials, stationary materials, and the like, or combinations thereof, especially if the presence of such features may be determined, but a measurement of range to the feature may be lacking in the detection device that detects the feature. However, it is expressly understood that active as well as passive data may be used in the present inventions' methods, in which case any single active signal may be used to determine a range value which can then be used in conjunction with passive data to fully resolve range, bearing, course and speed.

In general, the present inventions' methods comprise obtaining at least three bearing and time data points for a first estimate, e.g. at time points $t_1$, $t_2$, $t_3$, $t_4$. These data are used to isolate a passive TMA estimate based on a single leg of time tagged, bearings only data, i.e. no maneuvering of the first point of interest such as ownship 1 is required to obtain a passive estimate. Further, the present inventions' methods comprise a closed form expression for an estimate that may be resolved in a single iteration as opposed to prior art methods such as those using first order statistical solutions.

The present inventions' methods utilize velocity vectors of the two items of interest, i.e. vector 13 and estimated vector 30. These velocity vectors, when arranged to determine their vector difference, form one side 52, 53 of a parallelogram as well as a diagonal of that parallelogram, shown as darkened portion 51 of vector 13. For the parallelogram to remain a parallelogram when angles of vertices of the parallelogram change, the perpendicular distances to respective opposite sides of the parallelogram change in a predetermined fashion, i.e. as the angles of the parallelogram whose diagonal remains at substantially the same orientation to ownship 1's constant course, change from $\pi/2$, the corresponding length of the diagonal must increase by an amount equal to the relative velocity of ownship 1 and target 2 multiplied by the new elapsed time value for the second course crossing minus $t_0$, such that perpendicular distance to opposing sides increases by an amount proportional to twice the range at CPA. Additionally, the greater the difference between values of adjacent vertices, the smaller the perpendicular distance to opposing sides.

Further, successive time-lagged bearing lines, e.g. lines 11 and 12, form a parabola, shown as solution parabola 15, in geometric reference frame 100 for substantially all geometries involving two points of interest 1,2, where each of the points of interest 1,2 maintains a substantially constant respective course and speed over a time period used for obtaining bearing measurements. Solution parabola 15 is formed by recognizing that each of the bearing lines 11,12, 13,20,30 in geographic reference frame 100 are tangent to solution parabola 15 at a predetermined, unique point. If the bearing lines of a data set belonging to one target are tangent to solution parabola 15 at various points along solution parabola 15, and if the angles of the parallelogram vertices change such that the angle of course incidence deviates from the value at which the relative velocity vector bisects the angle of course incidence and the courses represented by two of the parallelogram sides are constrained to remain tangent to the parallelogram, the perpendicular distance to opposing sides always increases. This increase may only be accomplished by increasing the parallelogram perimeter.

Accordingly, solution parabola 15 will be fixed in geographic reference frame 100, and each data set to be gathered will generate one and one only solution parabola 15, although different data sets may generate the same solution parabola 15. Further, for all potential pairs of bearing lines 11,12,13, 20,30 tangent to solution parabola 15 when the course of ownship 1 is one of the bearing lines and remains fixed, e.g. line 13, the value of the bearing at the CPA, e.g. angle 50', is constant for potential ranges at CPA. As a result, the difference vector of each potential velocity vector pair, i.e. velocity vector for target 2 and velocity vector of ownship 1, remains parallel for all geometries involving those two points of interest where each point of interest 1, 2 maintains its respective course and speed at a constant value during the time of measurements and calculation. This allows calculation of bearing at CPA, time of CPA, and minimum range at CPA, with data comprising a single leg of passive, time tagged bearings. Further, this allows estimates of TMA solutions based on minimum range and preferred range estimates with data comprising a single leg of passive, time tagged bearings.

Referring now to FIG. 2, to help ensure that solution parabola 15 is fixed at the correct location in geographic reference frame 100, the presently preferred embodiment of the present inventions' methods requires fixing an ownship 1 at rest reference frame 200 with respect to geographic reference frame 100. In the preferred embodiment, this may be accomplished by requiring that the location of ownship 1 at an initial time $t_0$ is the same point in the two reference frames, e.g. 10, and that the bearing value $BRG_0$ is equal to zero (as used herein "BRG" means bearing).

In the case where the incident angle of the mutual courses of target 2 and ownship 1 is greater than $\pi/2$, an additional step may be required to reflect the original bearing line data, e.g. 13, around a preferred bearing line in the original data set indicated by the axis of original solution parabola 15 to generate revised parabola 15 for a set of pseudo-data that reflects the course of target 2 in a reference frame for which the incident angles of courses is less than $\pi/2$. This situation will also require extrapolating the course of ownship 1 into a predetermined future time point and reversing the course such that the ownship arrives at the same point at the time ownship 1 crosses the course of target 2.

Referring additionally to FIG. 1, ownship 1 is located initially at point 10. In the preferred embodiment, a first step to calculation of solution parabola 15 is to obtain three bearing data points, e.g. at times $t_1$,$t_2$,$t_3$,or $t_4$, wherein the times $t_1$,$t_2$,$t_3$, or $t_4$ at which the bearing data points were obtained are also obtained. Bearing data is collected in a fixed ownship reference frame such as frame 100. At a minimum, three bearing-time data points are obtained that are relative bearings with respect to point 10.

Bearing data may then be translated to a moving ownship reference frame 200. Two sets of data may form vectors, one set representing target 2, e.g. 30, and the other set representing ownship 1, e.g. 13, which may then cross each other at different times. By way of example and not limitation, vectors 30 and 13 may cross when target 2 appears at 0° relative bearing or 180° known bearing, or when ownship 1 appears at 0° relative to the course of target 2 or when ownship 1 appears at 180° unknown to the course of target 2.

As will be understood, a large, potentially infinite number of potential solution points may exist based on passive bearing data. Accordingly, the present inventions' method selects at least one potential solution point, e.g. bearing line 20, to indicate a range at CPA. In a preferred embodiment, bearing line 20 may be selected manually by examining target geometry. In alternative embodiments, bearing line 20 may be selected automatically such as by using artificial intelligence methods, heuristics, or the like, or a combination thereof.

Referring back to FIG. 1, once the initial three bearing data are obtained, a first estimate may be computed for relative bearing at CPA, as well as a time of CPA, by the following formulae:

$$\tan(\theta_\beta-\theta_i)/=V_{REL}(t_\beta-t_i)/R_{CPA}|\theta_i=0 \quad (1)$$

$$t_\beta=R_{CPA}[\tan(\theta_\beta-\theta_i)/V_{REL}]+t_i|\theta_i=0 \quad (2)$$

$$(\theta_\beta) = \tan^{-1}\left[\frac{\tan(\theta_i)\Delta t_{j,k} + \tan(\theta_j)\Delta t_{k,i} + \tan(\theta_k)\Delta t_{i,j}}{\tan(\theta_j)\tan(\theta_k)\Delta t_{j,k} + \tan(\theta_i)\tan(\theta_k)\Delta t_{k,i} + \tan(\theta_i)\tan(\theta_j)\Delta t_{i,j}}\right] \quad (3)$$

In these equations (1), (2), and (3),

- $\theta_\beta$ is as defined in equation (3) and representatively shown as angle 50 in FIG. 1;
- $\theta_i$ is the bearing angle to the target 2 relative to ownship 1 at time $t_i$ and representatively shown as angle 50' in FIG. 1;
- $t_\beta$ is the time at which $\theta_\beta$ was measured;
- $t_i$ is the time at which $\theta_i$ was measured;
- $\Delta t$ is the difference between two time measurements, e.g. $\Delta t_{j,k}$ is the difference between time $t_j$ and time $t_k$;
- $V_{REL}$ is the difference velocity between target 2 and ownship 1; and
- $R_{CPA}$ is the range to target 2 at CPA.

The formulae of the present inventions' methods may then be used to calculate a bearing fan to determine bearing data at a predetermined time in the future, independent of other position data. A bearing fan is a group of bearing data spaced at predetermined points in time that predicts where in bearing space target 2 will be at some point in future time, assuming that target 2 and ownship 1 maintain their current course and speed. By way of example and not limitation, the present inventions may be used to generate both relative and true bearings and time at CPA, where the time at relative bearing equals zero degrees (0°) or one hundred eighty degrees (180°).

The formulae also provide an early estimate of minimum target ranges for any bearing, independent of other position data. Further, the formulae may be useful in many other ways, by way of example and not limitation for providing parameters useful for early target maneuver detectors or Open/Close determinations as well as estimates of a ratio of relative speed to range at CPA.

The present inventions' methods may further be used to provide a real-time measure of the effect of noise on potential solutions. In a preferred embodiment, this real-time measure begins with a fourth data point, e.g. data point $t_4$.

Having selected a potential solution point, e.g. bearing line 20, the direction of the relative velocity vector 60 can be determined.

Figure 4:
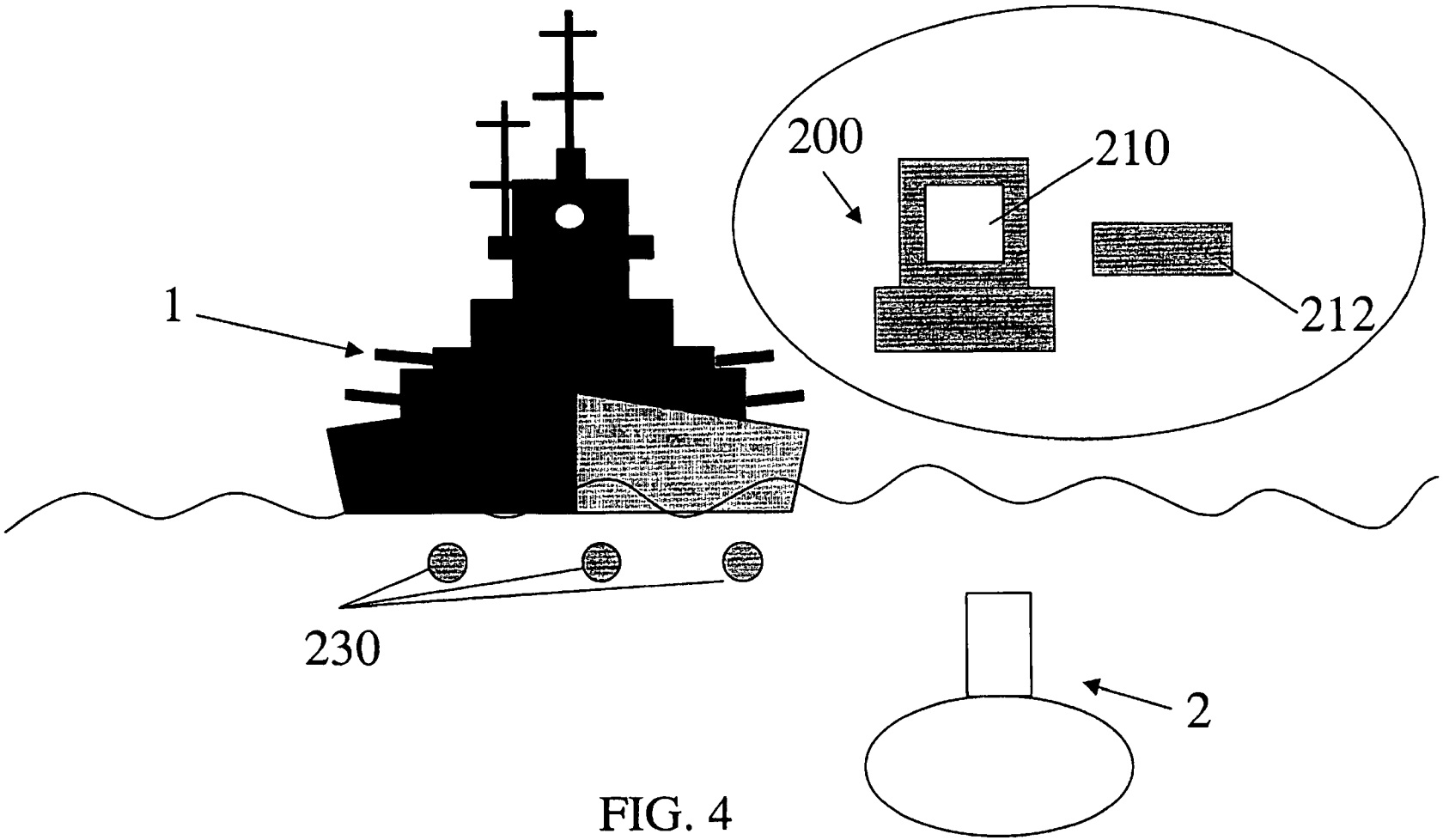
FIG. 4 is a schematic representation of an exemplary system.

Referring now to FIG. 4, in a preferred embodiment, data obtained for the calculations defined herein are preferably manipulated by computer 200 which has been programmed to carry out the functions set forth in this description and typically accessible to ownship 1 such as by being onboard ownship 1. Computer 200 may comprise any suitable computer known in the art. Computer 200 further comprises a processor, memory, and output device (not shown in the figures) as well as range calculation software executing within computer 200. Output device 210 may comprise a display device 210, a hard copy device 212, or the like, or a combination thereof.

Data sets comprising passive bearing data may be gathered such as by using one or more sensors (shown as 230 in FIG. 4 for illustration) deployed within or near ownship 1 and capable of passively obtaining a bearing to target 2 from a desired location such as ownship 1 and providing measurements related to target 2 and ownship 1. Sensors 230 may comprise any suitable sensors known in the art such as passive acoustic sensors. The data may be passively obtained by numerous means as will be familiar to those of ordinary skill in the passive data acquisition arts. Once gathered, these data may be stored for later processing in the memory of computer 200 or in a passive bearing data collection device (not shown in the figures) that is addressably in communication with the computer. The analysis performed may occur within the computer or a portion of the computer which has been programmed to analyze the data received by the sensors.

Using the range calculation software, the computer may retrieve at least three of the stored bearing data points obtained from the bearing detector, such as from the computer's memory. The range calculation software may then use the three retrieved bearing data points to determine a speed contribution $V_{os}\ cos(\theta_\beta)$ of a first point of interest to a distance from a relative velocity vector over a time from $t_0$ to $t_0'$ in accordance with the teachings of the present inventions. By way of example and not limitation, in accordance with the teachings of the present inventions the range calculation software may determine an angle $\theta_\beta$ defined by the bearing of target 2 relative to a heading of ownship 1 at the point in time of closest approach to a second point of interest and then calculates a minimum range from the source to the target as $$\text{Min } R_{CPA}=V_{os}(t_\beta-t_i)\cos(\theta_\beta-\theta_i)_{\theta_i|=0}; \text{ and}$$

The range calculation software may then generate a representation of the probability of the location of target 1 and present that information such as on the output device.

In the operation of an exemplary embodiment, referring to FIG. 1 and FIG. 2, it is first noted that the following expression holds for linear motion when an object moving in a straight line with a velocity of $V_R$, e.g. target 2, passes a stationary observer, e.g. ownship 1, at a distance of $R_{CPA}$ where $R_{CPA}$ is the distance at closest approach to the stationary observer:

$$\tan(\theta_i-\theta_0)=(t_i-t_0)(V_R/R_{CPA}) \quad (4)$$

As used in equation (4), $\theta_0$ is the angle between ownship 1's heading and target 2 at an initial time $t_0$;

$\theta_i$ is the angle between ownship 1's heading and target 2 at time $t_i$;

$t_i$ is the time of bearing reading $\theta_i$; and $t_0$ is the time of bearing reading $\theta_0$.

Further, the ratio $V_R/R_{CPA}$ is a calculated value, and therefore $V_R$ may be estimated based on an estimated value of $R_{CPA}$. Alternatively, $R_{CPA}$ may be estimated based on an estimated value of $V_R$.

Additionally, it is noted that relative velocity vector 60 is perpendicular to the relative bearing line 20 at CPA in fixed ownship reference frame 100, allowing for calculation of a minimum range estimate at CPA $R_{CPA}$ that is substantially independent of actual contact range. By way of example and not limitation, although at this point the "correct" solution may be unknown, a minimum range estimate calculation is possible because a point when CPA occurs is known as is the point at which target 2 is detected at relative bearing equals $\theta_\beta$. The minimum range estimate for the distance at which ownship 1 is closest to target 2, $R_{CPA}$, shown in FIG. 1 at 51, may be calculated by:

$$\text{Min } R_{CPA}=V_{os}(t_\beta-t_0)\cos(\theta_\beta-\theta_0) \quad (5)$$

In equation (5), $t_\beta$ is the time at which $\theta_\beta$ was measured;

$t_0$ is the time of bearing reading $\theta_0$;

$V_{os}$ is magnitude of the velocity of ownship; and $\theta_0$ is the angle between ownship 1's heading and target 2 at a time $t_i=0$.

If an actual solution is selected, a right triangle may be formed by using ownship vector 51 multiplied by the $\Delta t_{CPA}$ as the hypotenuse 32 of that triangle. Accordingly, the contact's range at CPA may be determined using hypotenuse 32, the relative bearing at CPA, and the relative velocity vector as follows:

$$R_{CPA_{est}}=V_{OS}*\Delta t_{CC}*\cos(\theta_\beta) \quad (6)$$

where $\Delta t_{CC}$ is the difference between course crossings, course crossings being defined as the time when ownship 1 crosses the target 2's course and to and the other components have the definitions given above.

Accordingly, using these estimates, the following calculations can then be made. For bearing BRG at CPA, independent of actual contact range, $$(\theta_\beta)=\tan^{-1}\left[\frac{\tan(\theta_i)\Delta t_{j,k}+\tan(\theta_j)\Delta t_{k,i}+\tan(\theta_k)\Delta t_{i,j}}{\tan(\theta_j)\tan(\theta_k)\Delta t_{j,k}+\tan(\theta_k)\tan(\theta_i)\Delta t_{k,i}+\tan(\theta_i)\tan(\theta_j)\Delta t_{i,j}}\right] \quad (7)$$

In equation (7), $\theta_i$ is the angle between ownship 1's heading and target 2 at time $t_i$;

$\theta_j$ is the angle between ownship 1's heading and target 2 at time $t_j$;

$\theta_k$ is the angle between ownship 1's heading and target 2 at time $t_k$; and $\Delta t_{\alpha,\beta}$ is the time difference between measurements $\theta_\alpha$, $\theta_\beta$ respectively, i.e., where $\alpha$ and $\beta$ are generic indices which are respectively pair-wise, i.e. (j,k), (k,i), and (i,j).

For the ratio of relative speed to the range at CPA, $$\frac{V_{REL}}{R_{CPA}}=\frac{\left[\frac{\tan(\theta_\beta)-\tan(\theta_i)}{1+\tan(\theta_\beta)\tan(\theta_i)}-\frac{\tan(\theta_\beta)-\tan(\theta_j)}{1+\tan(\theta_\beta)\tan(\theta_j)}\right]}{\Delta t_{ij}} \quad (8)$$

In equation (8), $\theta_\beta$ is the BRG at CPA;

$\theta_i$ is the angle between ownship 1's heading and target 2 at time $t_i$;

$\theta_j$ is the angle between ownship 1's heading and target 2 at time $t_j$; and $\Delta t_{i,j}$ is the time difference between measurements $\theta_i$ and $\theta_j$.

For the time of CPA independent of actual contact range, $$t_\beta=\frac{R_{CPA}}{V_{REL}}[\tan(\theta_\beta-\theta_i)]+t_i\Big|_{\theta_i=0} \quad (9)$$

In equation (9), $\theta_\beta$ is the angle between ownship 1's heading and target 2 at CPA;

$\theta_i$ is the angle between ownship 1's heading and target 2 at time $t_i$;

$t_i$ is the time of bearing reading $\theta_i$; and $t_\beta$ is the time of bearing reading $\theta_\beta$, time at which CPA occurs.

For an estimate of the minimum range at CPA, independent of actual contact range, $$\text{Min}R_{CPA}=V_{os}(t_\beta-t_i)\cos(\theta_\beta-\theta_i)_{\theta_i=0} \quad (10)$$

In equation (10), $\theta_\beta$ is the angle between ownship 1's heading and target 2 at CPA;

$\theta_i$ is the angle between ownship 1's heading and target 2 at time $t_i$;

$V_{os}$ is a magnitude of ownship's velocity;

$t_i$ is time of bearing reading $\theta_i$; and $t_\beta$ is the is the time at which $\theta_\beta$ was measured.

Using these formulae, an estimate of minimum range at a predetermined time may therefore calculated by:

$$\text{Min } R_{est}=\text{Min. } R_{CPA}/\cos(\theta_\beta-\theta_j)|\theta_j=\text{current bearing measure} \quad (11)$$

where the terms in equation (11) are defined above.

Further, from an estimate of $R_{CPA(Minimum)}$ an estimate of the current minimum range at any time $t_i$ make be found using the following formula:

$$R_{(CURRENTMINIMUM)}=R_{CPA(MINIMUM)}/\cos(\theta_0-\theta_i) \quad (14)$$

In an exemplary embodiment, the above may be used to base target open-close on measurements calculated at the time of the decision.

Figure 3:
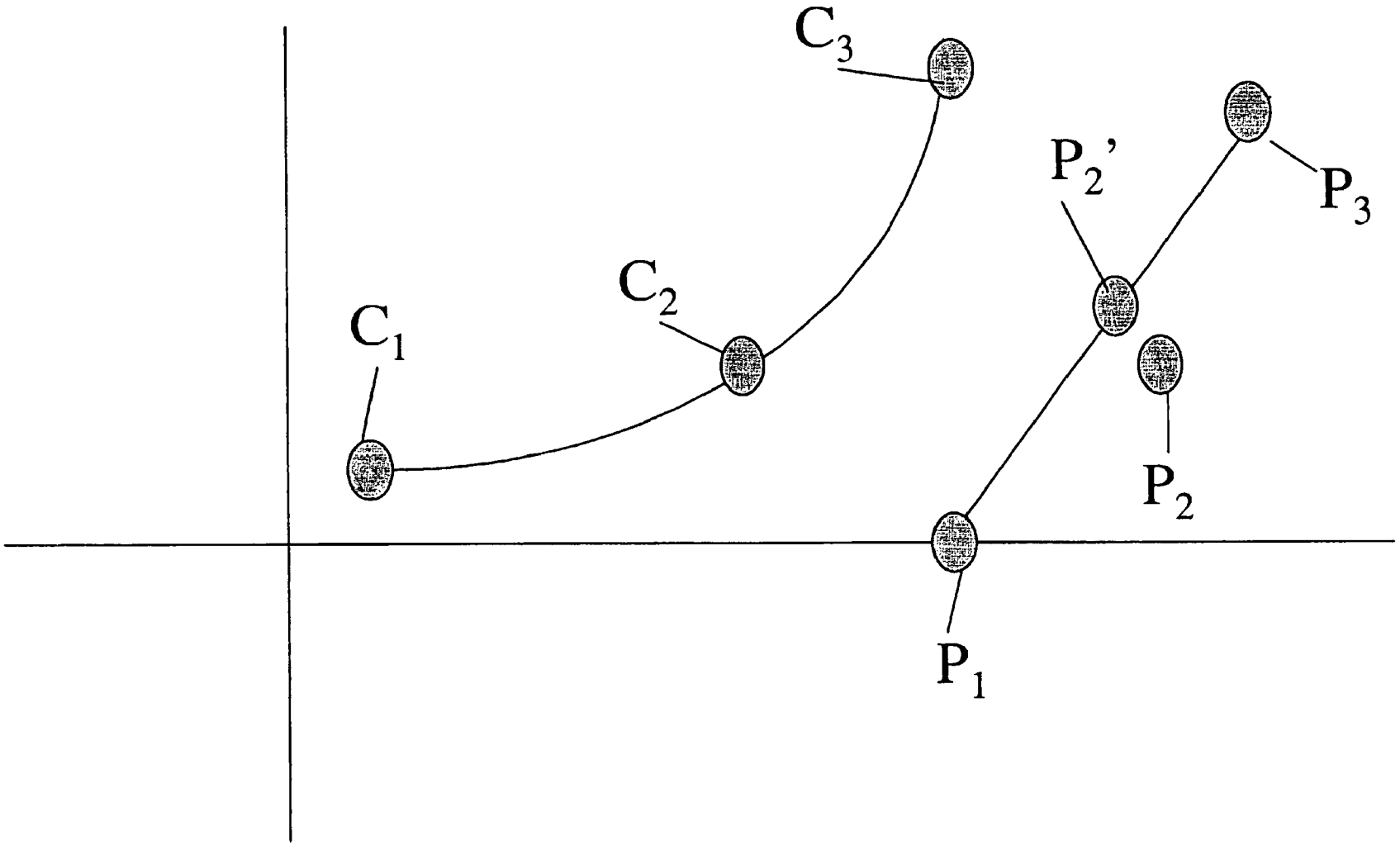
FIG. 3 is an exemplary Cartesian plot showing determination of target maneuvers and noise in the system.

Referring now to FIG. 3, a Cartesian graph of target maneuvers and noise, if more than three points are used, a series of subsequent measurements may be used to determine maneuvering of target 2. By way of example and not limitation, a set of five or more usable bearing points may be obtained as a set of calculated points $C_1$, $C_2$, and $C_3$ in accordance with the teachings of the present inventions during times $\{t_1,t_2,t_3\}$, $\{t_2,t_3,t_4\}$, and $\{t_3,t_4,t_5\}$ (these time points are not shown in FIG. 3). Points $C_1$, $C_2$, and $C_3$ may be extrapolated to indicate that target 2 (shown as the dark circles in FIG. 3) is maneuvering in a non-linear fashion.

Additionally, the estimates may be used to determine noise or a range of noise in the readings. By way of example and not limitation, a set of five or more usable bearing points may be interpreted as a set of calculated points $P_1$, $P_2$, and $P_3$ obtained in accordance with the teachings of the present inventions during times $\{t_6,t_7,t_8\}$, $\{t_7,t_8,t_9\}$, and $\{t_8,t_9,t_{10}\}$ (these time points are not shown in FIG. 3). However, $P_2$ can be seen to have deviated from a predicted point $P_2'$, indicating that noise is present in the system. In a currently envisioned embodiment, trends over time may therefore use these deviations to estimate the amount and effects of noise present in the system. If an assumption is made that any set of four points represents a stable, noise-free solution, analysis of deviation from a predicted point may be made with four points. In such an analysis, a fifth point may then be obtained and used to determine if the deviation is random or the result of a deterministic event, e.g. a maneuvering of target 2. Thus, a minimum set of points required to detect the possible presence of noise is four, and the minimum set of points required to detect the possible presence of maneuvering of target 2 is five.

Referring back to FIG. 2, in a reference frame 200 relative to a position of ownship 1, three bearing/time measurements are taken, an angle to bearing at CPA relative to a heading of ownship 1 is calculated, and the time of CPA is calculated. Based on the teachings of these inventions that target 2 and ownship 1 remain on a constant course and speed over a period of time required to collect bearing measurements, a fourth data point may be obtained. When taken with any of the other two of the three bearing data points, the fourth data point should yield the same solution, i.e., the angle to bearing at CPA relative to the heading of ownship 1, and the time of CPA will be constant for all combinations of the three of four bearing data points. A deviation in the bearing at CPA relative to the heading of ownship 1 and the time of CPA represents noise in the system which can be detected by this method of calculating the angle to bearing at CPA for each potential solution.

Prior art methods look at each bearing measurement as a unique point in "the" solution set and do not consider triplet-wise combinations of points as potential solutions to the angle at CPA, each one as valid as the other, if the bearing measurements are independent. Therefore, with the present inventions, with four data points, four potential solutions may be investigated; with five independent points, ten potential solutions may be investigated; and with six independent points, twenty potential solutions may be investigated. This is quickly recognized as the number of possible combinations of n items taken three at a time. A statistical analysis of the potential solutions may then yield trends and/or the mean and standard deviation of bearings at CPA. The mean of the bearing at CPA and the mean time of CPA are more accurate solutions of the bearing at CPA and time of CPA than any one potential solution based on a triplet of bearing measurements.

Thus, the present inventions may allow creating twenty solutions with only six data points rather than waiting for twenty data points. Likewise, four points may be sufficient to determine that there is noise in system and calculating four bearing angle solutions at CPA provides a first order estimate of the magnitude of the noise and a first order estimate of the mean bearing at CPA and mean time of CPA.

It is also noted that in the preferred embodiment, bearing rate curve inflection points are always plus or minus around 30° of the BRG at CPA.

It will be understood that various changes in the details, materials, and arrangements of the parts which have been described and illustrated above in order to explain the nature of this inventions may be made by those skilled in the art without departing from the principle and scope of the inventions as recited in the following claims.

What is claimed is:

1. A method of estimating a minimum range *from an ownship* to a target *at a closest point of approach* (*CPA*) *between the target and the ownship*, comprising:

[a.] *a bearing detector* obtaining at least three bearing data points of the target with respect to [an] *the* ownship, *wherein each of said bearing data points includes a bearing angle and a corresponding time of acquisition*;

[b. using the three bearing data points to determine a speed contribution $V_{os}$ of a first point of interest to a distance from a relative velocity vector over a time frame comprising an initial time $t_o$ to a predetermined time $t_i$;]

[c.] *a computer system* determining an angle $\theta_\beta$[as defined as], *where* $\theta_\beta$ *is* the bearing relative to the ownship's heading at the [point in ] time ($t_\beta$) of *the* closest *point of* approach [to a second point of interest]; and

[d.] *the computer system* calculating a minimum range Min $R_{CPA}$ using the formula*:*

$$\text{Min } R_{CPA}=V_{OS}(t_\beta-t_i)\cos(\theta_\beta-\theta_i)_{\theta_i=0};$$

*using the calculated minimum range for at least one of: targeting a weapon with respect to the target, navigating the ownship;*

[e.] wherein [$t_\beta$ is the time at which $\theta_\beta$ was mreaured and] $\theta_i$ is a bearing angle [to the target relative to the ownship] *corresponding to a first of said at least three bearing data points obtained* at time $t_i$, *and* $V_{os}$ *is the speed of the ownship during said obtaining said at least three bearing data points*.

2. The method of claim 1, further comprising generating a representation of the probability of the location of the target using the calculated minimum range.

3. The method of claim 1, wherein the calculated minimum range is *further* used for [at least one of targeting a weapon with respect to the second point of interest, navigation of the ownship,] estimating a passing range between the ownship and the [second point of interest] target[, and avoidance of the second point of interest].

4. The method of claim 1, wherein the *at least three bearing* data points are obtained passively.

5. The method of claim 1, further comprising:

[f.] obtaining *a* fourth *bearing* data point [of the second point with respect to an ownship];

[g.] calculating a further set of minimum ranges using the formula [of step (d)] *for Min* $R_{CPA}$; and

[h.] repeating [steps (e) and (f)] *obtaining bearing data points and performing corresponding calculations of Min* $R_{CPA}$ to determine a maneuvering of the [second point of interest] *target* over time.

6. The method of claim 1, further comprising:

[f.] obtaining an additional plurality of *bearing* data points of the [second point] *target* with respect to [an] *the* ownship;

[g.] calculating a further set of minimum ranges using the formula [of step (d)] *for Min* $R_{CPA}$; and

[h.] determining a deviation of a calculated minimum range from others of the calculated minimum ranges.

7. A method for estimating a minimum range Min $R_{CPA}$ to a contact *from an ownship*, independent of actual contact range, comprising:

a. *a bearing detector* passively obtaining at least three bearing data points of the contact relative to [an] *the* ownship;

b. *a computer system* determining an angle $\theta_\beta$ defining the bearing *to the contact* relative to [a heading of] the ownship at the point in time of closest approach to [a second point of interest] *the contact*;

c. *the computer system* calculating [a] *the* minimum range at [CPA] *a closest point of approach* (*CPA*) between the ownship and the [target] *contact* using the formula $$\text{Min } R_{CPA}=V_{os}(t_\beta-t_i)\cos(\theta_\beta-\theta_i)_{\theta_i=0}; \text{ and}$$

[d. generating a representation of the probability of the location of the target ]*contact* [located at the minimum range;]

*d. using the calculated minimum range to alter a heading of the ownship;* e. wherein $t_\beta$ is the time [at which] *corresponding to* $\theta_\beta$[was measured], $\theta_i$ is a bearing angle to the contact relative to the ownship at time $t_i$; and $V_{os}$ is a speed [contribution] of [a first point of interest to a distance from a relative velocity vector over a time frame comprising an initial time $t_0$ to a predetermined time $t_i$] *the ownship during said passively obtaining said at least three bearing data points*.

8. The method of claim 7, further comprising:

f. obtaining a fourth data point;

g. using the fourth data point to calculate an angle to bearing at CPA relative to the heading of the ownship;

h. calculating a time of CPA for all combinations of the three of four bearing data points; and i. determining noise in the system by comparing a deviation in at least one of the bearing at CPA, relative to the heading of the ownship and the time of CPA for each potential solution, to a predetermined value.

9. The method of claim 8, wherein the step of determining noise in the system further comprises determining the mean and standard deviations in the bearing calculations at CPA.

10. The method of claim 7 further comprising:

f. obtaining an estimate of a current minimum range at a time $t_i$, the estimate comprising:

i. calculating a current minimum range $R_{(current\ minimum)}$ by dividing *Min* $R_{CPA}$ by the cosine of $(\theta_\beta-\theta_i)$ where $\theta_0$ is a bearing relative to the ownship when $\theta=0$, and $\theta_i$ is a bearing relative to the ownship at time $t_i$; and ii. generating a representation of the probability of the location of the contact.

11. The method of claim 7, further comprising:

f. obtaining [said] additional *bearing* data points of the [second point of interest] *contact* with respect to said ownship;

g. using the additional *bearing* data points to refine the system noise estimate by calculating the mean and standard deviation of the bearings at CPA;

h. using the additional *bearing* data points to refine the mean bearing at CPA with respect to ownship's heading;

i. determining a trend of change in the mean value of bearing at CPA with respect to ownship's heading;

j. using the trend of change in the mean value of bearing at CPA with respect to ownship's heading to determine change in *a* relative velocity vector between said ownship and said [target] *contact*.

12. A system for calculating an estimated minimum range [estimate] $R_{CPA}$ from a source to a target, comprising:

a. a bearing detector capable of passively obtaining a bearing to the target from the source;

b. a computer having a processor and memory; and c. range calculation software executing in the computer;

d. wherein i. the memory stores at least three bearing data points obtained from the bearing detector;

ii. the range calculation software uses the stored three bearing data points to determine a speed [contribution] $V_{os}$ of the [target to a distance from a relative velocity vector over] *source during* a time [from $t_0$ to $t_0'$] *when said at least three bearing data points are obtained*;

iii. the range calculation software determines an angle $\theta_\beta$ defined by the bearing *to the target* relative to [a heading of] the source at the point in time of closest approach [to] *between the source and* the target;

iv. the range calculation software calculates a minimum range from the source to the target[and as Min $R_{CPA}=V_{OS}(t_\beta-t_i)\cos(\theta_\beta\theta_i)_{\theta i|=0}$; and]. *wherein said minimum range is based in part on* $V_{os}$, $\theta_\beta$, *and the point in time of closest approach; and*

[v. the range calculation software generates a representation of the probability of the location of a target.]

*wherein the system is configured to use the calculated minimum range to alter a heading of the source;*

*wherein the source and the target are physical objects.*

13. The system of claim 12 further comprising an output device capable of reproducing a representation of at least one of the calculated minimum range output and the probability of the location of the target.

*14. A method, comprising:*

*a. a bearing detector obtaining at least three bearing data points of a target with respect to a vehicle;*

*b. a computer system determining an angle* $\theta_\beta$, *wherein* $\theta_\beta$ *is defined as the bearing of the target relative to the vehicle's heading at the time of closest approach to the target;*

*c. the computer system estimating a minimum range from the vehicle to the target using said obtained three bearing data points, said bearing angle* $\theta_\beta$ *and a speed of the vehicle during said obtaining; and*

*d. using said estimated minimum range to alter a heading of the vehicle.*

*15. The method of claim 1, further comprising using said calculated minimum range at the closest point of approach to estimate a minimum range at time* $t_i$.

*16. The method of claim 15, wherein said minimum range at said time* $t_i$ *is equal to Min* $R_{CPA}$ *divided by* $\cos(\theta_0-\theta_i)$, *wherein* $\theta_0$ *is a bearing angle at time* $t_0$ *and* $\theta_i$ *is a bearing angle at said time* $t_i$.

*17. The method of claim 1, wherein* $\theta_\beta$ *is calculated according to the following formula:*

$$(\theta_\beta) = tan^{-1}\left[\frac{tan(\theta_i)\Delta t_{j,k} + tan(\theta_j)\Delta t_{k,i} + tan(\theta_k)\Delta t_{i,j}}{tan(\theta_j)tan(\theta_k)\Delta t_{j,k} + tan(\theta_i)tan(\theta_k)\Delta t_{k,i} + tan(\theta_i)tan(\theta_j)\Delta t_{i,j}}\right];$$

*wherein* $\theta_j$ *and* $\theta_k$ *are bearing angles respectively corresponding to second and third ones of said at least three bearing data points, wherein* $\theta_j$ *and* $\theta_k$ *are obtained at times* $t_j$ *and* $t_k$ *respectively, and wherein* $\Delta t_{j,k}$, $\Delta t_{k,i}$, $\Delta t_{i,j}$ *are the differences between times* $t_j$ *and* $t_k$; $t_k$ *and* $t_i$; *and* $t_i$ *and* $t_j$, *respectively.*

*18. The method of claim 7, further comprising using said calculated minimum range at the closest point of approach to estimate a minimum range at time* $t_i$.

*19. The method of claim 18, wherein said minimum range at said time* $t_i$ *is equal to Min* $R_{CPA}$ *divided by* $\cos(\theta_0-\theta_i)$, *wherein* $\theta_0$ *is a bearing angle at time* $t_0$ *and* $\theta_i$ *is a bearing angle at said time* $t_i$.

20. The method of claim 7, wherein $\theta_\beta$ is calculated according to the following formula:

$$(\theta_\beta) = tan^{-1}\left[\frac{tan(\theta_i)\Delta t_{j,k} + tan(\theta_j)\Delta t_{k,i} + tan(\theta_k)\Delta t_{i,j}}{tan(\theta_j)tan(\theta_k)\Delta t_{j,k} + tan(\theta_i)tan(\theta_k)\Delta t_{k,i} + tan(\theta_i)tan(\theta_j)\Delta t_{i,j}}\right];$$

wherein $\theta_j$ and $\theta_k$ are bearing angles respectively corresponding to second and third ones of said at least three bearing data points, wherein $\theta_j$ and $\theta_k$ are obtained at times $t_j$ and $t_k$ respectively, and wherein $\Delta t_{j,k}$, $\Delta t_{k,i}$, $\Delta t_{i,j}$ are the differences between times $t_j$ and $t_k$; $t_k$ and $t_i$; and $t_i$ and $t_j$, respectively.

21. A method for tracking a second point of interest relative to a first point of interest, said method comprising:

a computer system receiving information indicative of at least three bearing data points of said second point of interest relative to said first point of interest, wherein each of the at least three bearing data points includes a bearing angle and a corresponding acquisition time, wherein each acquisition time is different;

the computer system estimating a minimum range of said second point of interest relative to said first point of interest, wherein said estimating uses one or more equations, wherein said one or more equations have a closed-form solution, and wherein at least one of said one or more equations is based in part upon three of said at least three bearing data points; and altering a heading of the first point of interest based at least in part on the estimated minimum range;

wherein the first and second points of interest are physical objects.

22. The method of claim 21, wherein at least one of said one or more equations is also based in part on a speed of said first point of interest.

23. The method of claim 22, wherein said estimated minimum range corresponds to a closest point of approach (CPA) between the first and second points of interest.

24. The method of claim 23, further comprising using said estimated minimum range corresponding to said CPA to estimate a minimum range at a time $t_i$.

25. The method of claim 24, wherein said minimum range at said time $t_i$ is equal to said minimum range corresponding to said CPA divided by $cos(\theta_0-\theta_i)$, wherein $\theta_0$ is a bearing angle at a time $t_0$ and $\theta_i$ is a bearing angle at said time $t_i$.

26. The method of claim 23, wherein said estimating said minimum range includes estimating a bearing angle $\theta_\beta$ at the CPA.

27. The method of claim 26, wherein said estimating $\theta_\beta$ is based in part upon said at least three bearing data points.

28. The method of claim 26, wherein $\theta_\beta$ is calculated using the following equation:

$$(\theta_\beta) = tan^{-1}\left[\frac{tan(\theta_i)\Delta t_{j,k} + tan(\theta_j)\Delta t_{k,i} + tan(\theta_k)\Delta t_{i,j}}{tan(\theta_j)tan(\theta_k)\Delta t_{j,k} + tan(\theta_i)tan(\theta_k)\Delta t_{k,i} + tan(\theta_i)tan(\theta_j)\Delta t_{i,j}}\right];$$

wherein $\theta_j$ and $\theta_k$ are bearing angles respectively corresponding to second and third ones of said at least three bearing data points, wherein $\theta_j$ and $\theta_k$ are obtained at times $t_j$ and $t_k$ respectively, and wherein $\Delta t_{j,k}$, $\Delta t_{k,i}$, $\Delta t_{i,j}$ are the differences between times $t_j$ and $t_k$; $t_k$ and $t_i$; and $t_i$ and $t_j$, respectively.

29. The method of claim 23, wherein the estimation of said minimum range is based upon a time $t_\beta$ corresponding to the CPA.

30. The method of claim 21, wherein said minimum range (Min $R_{CPA}$) corresponds to a closest point of approach (CPA) between the first and second points of interest, and wherein Min $R_{CPA}$ is calculated according to the formula Min $R_{CPA}=V_{os}(t_\beta-t_i)cos(\theta_\beta-\theta_i)_{\theta i|=0}$, and wherein $V_{os}$ is a speed of said first point of interest, $\theta_i$ is a bearing angle between the first point of interest and the second point of interest at time $t_i$, and $\theta_\beta$ is a bearing angle between the first point of interest and the second point of interest at time $t_\beta$, wherein $t_\beta$ is an estimated time corresponding to the CPA.

31. The method of claim 21, wherein said at least three bearing data points include four or more bearing data points, the method further comprising estimating a minimum range corresponding to each three data point-combination of the four or more bearing data points.

32. The method of claim 31, further comprising performing a statistical analysis on each of said estimated minimum ranges.

33. The method of claim 32, wherein said statistical analysis includes calculating a mean minimum range.

34. The method of claim 32, wherein said statistical analysis includes calculating a standard deviation of said estimated minimum range.

35. The method of claim 21, wherein said receiving includes receiving four or more bearing data points, the method further comprising using the received four or more data points to detect the presence of noise.

36. The method of claim 21, wherein said receiving includes receiving five or more bearing data points, the method further comprising using the received five or more data points to detect maneuvering of said second point of interest.

37. The method of claim 21, wherein said first point of interest is a water vessel.

38. The method of claim 21, wherein said second point of interest is a water vessel.

39. The method of claim 21, wherein said first point of interest is in motion, and said second point of interest is stationary.

40. The method of claim 21, wherein the one or more equations include the following mathematical operations: addition, subtraction, multiplication, division, cosine, tangent, inverse tangent.

41. The method of claim 21, further comprising using said estimated minimum range to launch a weapon at said second point of interest.

42. A method for tracking a second point of interest relative to a first point of interest, said method comprising:

a computer system receiving information indicative of at least three bearing data points, wherein each of said at least three bearing data points includes a bearing angle and a corresponding acquisition time, wherein each bearing angle is measured between a heading of said first point of interest and the second point of interest at said corresponding acquisition time, wherein each said corresponding acquisition time is different;

the computer system estimating a minimum range of said second point of interest relative to said first point of interest, wherein said estimating is performed in a single iteration through a set of one or more equations, wherein said set of equations are based in part upon three of said at least three bearing data points; and altering a heading of the first point of interest based at least in part on the estimated minimum range;

wherein the first and second points of interest are physical objects.

43. The method of claim 42, wherein said set of equations are based in part upon a speed of the first point of interest.

44. The method of claim 42, wherein said at least three bearing data points is a number (N) of bearing data points greater than or equal to four, said method further comprising performing a number (C) of minimum range calculations for each three data point-combination of said N bearing data points, where $C=N!/((N-3)!*3!)$, wherein each of said C minimum range calculations is performed in a single iteration through said set of equations.

45. The method of claim 42, further comprising computing a mean minimum range from said C minimum range calculations.

46. The method of claim 42, further comprising computing a standard deviation of said C minimum range calculations.

47. The method of claim 42, wherein either or both of said first and second points of interest are water vessels.

48. The method of claim 42, wherein said set of equations is based in part upon an angle between a heading of said first point of interest and said second point of interest at a closest point of approach between said first and second points of interest.

49. The method of claim 42, further comprising using said estimated minimum range to alter a heading of said first point of interest.

50. The method of claim 42, further comprising using said estimated minimum range to launch a weapon at said second point of interest.

51. The method of claim 42, wherein said minimum range corresponds to a closest point of approach between said first and second point of interest.

52. The method of claim 42, further comprising using said minimum range at said closest point of approach to calculate a minimum range at a different time.

53. A system, comprising:

a processor; and a memory coupled to the processor, wherein the memory is configured to store program instructions executable by the processor to:

receive at least three bearing data points of a second point of interest relative to a first point of interest, wherein each of the at least three bearing data points includes a bearing angle and a corresponding acquisition time, wherein each bearing angle is an angle between a heading of said first point of interest and a second point of interest at said corresponding acquisition time, wherein each acquisition time is different, and wherein said first and second points of interest are physical objects; and estimate a minimum range of said second point of interest relative to said first point of interest, wherein said estimation uses one or more equations, wherein said one or more equations have a closed-form solution, and wherein at least one of said one or more equations is based in part upon three of said at least three bearing data points;

wherein said system is further configured to use said estimated minimum range to alter a heading of said first point of interest.

54. The system of claim 53, further comprising one or more bearing detectors configured to obtain bearing data points.

55. The system of claim 54, wherein said bearing detectors are configured to obtain said bearing data points passively.

56. The system of claim 53, wherein the one or more equations include the following mathematical operations: addition, subtraction, multiplication, division, cosine, tangent, inverse tangent.

57. The system of claim 53, wherein said system is further configured to use said estimated minimum range to target said second point of interest using a weapons system configured to target said second point of interest.

58. The system of claim 53, wherein said estimated minimum range corresponds to a closest point of approach (CPA) between said first and second points of interest, and wherein said system is further configured to use said estimated minimum range in order to estimate a minimum range at a time other than a time corresponding to said CPA.

59. A system, comprising:

a processor; and a memory coupled to the processor, wherein the memory is configured to store program instructions executable by the processor to:

receive at least three bearing data points of a second point of interest relative to a first point of interest, wherein said data points are acquired at different times, and wherein said first and second points of interest are physical objects; and estimate a minimum range of said second point of interest relative to said first point of interest, wherein said estimating is performed in a single iteration through a set of one or more equations, wherein said set of equations are based in part upon three of said at least three bearing data points;

wherein said system is further configured to use said estimated minimum range to target said second point of interest with a weapons system.

60. The system of claim 59, wherein each of the at least three bearing data points includes a bearing angle and a corresponding acquisition time.

61. The system of claim 59, further comprising one or more bearing detectors configured to obtain bearing data points.

62. The system of claim 59, wherein the number of said at least three bearing data points is a number (N) greater than or equal to four, said method further comprising performing a number (C) of minimum range calculations for each three data point-combination of said N bearing data points, where $C=N!/((N-3)!*3!)$, wherein each of said C minimum range calculations is performed in a single iteration through said set of equations.

63. The system of claim 59, wherein said system is further configured to use said estimated minimum range to alter a heading of said first point of interest.

64. A non-transitory computer readable medium comprising program instructions, wherein the instructions are computer-executable to:

receive at least three bearing data points of a second point of interest relative to a first point of interest, wherein each of the at least three bearing data points includes a bearing angle and a corresponding acquisition time, wherein each acquisition time is different;

estimate a minimum range of said second point of interest relative to said first point of interest, wherein said estimation uses one or more equations, wherein said one or more equations have a closed-form solution, and wherein said one or more equations are based in part upon three of said at least three bearing data points; and use said estimated minimum range to alter a heading of said first point of interest;

wherein said first and second points of interest are physical objects.

65. The non-transitory computer readable medium of claim 64, wherein the one or more equations include the following mathematical operations: addition, subtraction, multiplication, division, cosine, tangent, inverse tangent.

*66. A non-transitory computer readable medium comprising program instructions, wherein the instructions are computer executable to:*

*receive at least three bearing data points of a second point of interest relative to a first point of interest, wherein each of said data points corresponds to different points in time, and wherein said first and second points of interest are physical objects;*

*calculate an estimation of a minimum range of said second point of interest relative to said first point of interest, wherein said estimation is performed in a single iteration through one or more equations, wherein said one or more equations depend in part upon three of said at least three bearing data points; and*

*use said estimated minimum range to target said second point of interest with a weapons system.*

*67. A method, comprising:*

*a computer system receiving information indicative of at least three bearing data points, wherein each of the at least three bearing data points includes a bearing angle and a corresponding acquisition time, wherein each bearing angle is measured between a heading of a first point of interest and a second point of interest, and wherein each acquisition time is different;*

*the computer system estimating a minimum range of said second point of interest relative to said first point of interest, wherein said estimating is based on one or more equations having a closed-form solution, and wherein said one or more equations are based in part upon three of said at least three bearing data points; and*

*using said estimated minimum range to change a heading of said first point of interest;*

*wherein said first point of interest and said second point of interest are physical objects, and wherein said first point of interest is a vehicle.*

*68. The method of claim 67, wherein said first point of interest is an automobile.*

*69. The method of claim 67, wherein said first point of interest is a water vessel.*

*70. The method of claim 67, wherein said first point of interest is an aircraft.*

*71. The method of claim 67, wherein said estimation of said minimum range is based in part upon a bearing angle $\theta_\beta$ that corresponds to a closest point of approach (CPA) between said first and second points of interest.*

*72. The method of claim 67, wherein said bearing angle $\theta_\beta$ at the CPA is calculated according to the following formula:*

$$(\theta_\beta) = tan^{-1}\left[\frac{tan(\theta_i)\Delta t_{j,k} + tan(\theta_j)\Delta t_{k,i} + tan(\theta_k)\Delta t_{i,j}}{tan(\theta_j)tan(\theta_k)\Delta t_{j,k} + tan(\theta_i)tan(\theta_k)\Delta t_{k,i} + tan(\theta_i)tan(\theta_j)\Delta t_{i,j}}\right];$$

*wherein $\theta_j$ and $\theta_k$ are bearing angles respectively corresponding to second and third ones of said at least three bearing data points, wherein $\theta_j$ and $\theta_k$ are obtained at times $t_j$ and $t_k$ respectively, and wherein $\Delta t_{j,k}$, $\Delta t_{k,i}$, $\Delta t_{i,j}$ are the differences between times $t_j$ and $t_k$; $t_k$ and $t_i$; and $t_i$ and $t_j$, respectively.*

*73. The method of claim 67, wherein said estimated minimum range corresponds to a closest point of approach (CPA) between said first and second points of interest, and wherein said method further comprises using said estimated minimum range at said CPA to estimate a minimum range at a time $t_i$.*

*74. The method of claim 73, wherein said minimum range at said time $t_i$ is equal to said minimum range at said CPA divided by $cos(\theta_0-\theta_i)$, wherein $\theta_0$ is a bearing angle at time $t_0$ and $\theta_i$ is a bearing angle at said time $t_i$.*

*75. A method, comprising:*

*a computer system receiving information indicative of at least three bearing data points, wherein each of the at least three bearing data points includes a bearing angle and a corresponding acquisition time, wherein each bearing angle is measured between a heading of a first point of interest and a second point of interest, and wherein each acquisition time is different, and wherein said first and second points of interest are physical objects;*

*the computer system estimating a minimum range of said second point of interest relative to said first point of interest, wherein said estimating is based on one or more equations having a closed-form solution, and wherein said one or more equations are based in part upon three of said at least three bearing data points; and*

*targeting said second point of interest using a weapons system, wherein said targeting is based in part upon said estimated minimum range.*

*76. The method of claim 75, wherein said first point of interest is a water vessel.*

*77. The method of claim 75, wherein said estimation of said minimum range is based in part upon a bearing angle $\theta_\beta$ that corresponds to a closest point of approach (CPA) between said first and second points of interest.*

*78. The method of claim 77, wherein said bearing angle $\theta_\beta$ at the CPA is calculated according to the following formula:*

$$(\theta_\beta) = tan^{-1}\left[\frac{tan(\theta_i)\Delta t_{j,k} + tan(\theta_j)\Delta t_{k,i} + tan(\theta_k)\Delta t_{i,j}}{tan(\theta_j)tan(\theta_k)\Delta t_{j,k} + tan(\theta_i)tan(\theta_k)\Delta t_{k,i} + tan(\theta_i)tan(\theta_j)\Delta t_{i,j}}\right];$$

*wherein $\theta_j$ and $\theta_k$ are bearing angles respectively corresponding to second and third ones of said at least three bearing data points, wherein $\theta_j$ and $\theta_k$ are obtained at times $t_j$ and $t_k$ respectively, and wherein $\Delta t_{j,k}$, $\Delta t_{k,i}$, $\Delta t_{i,j}$ are the differences between times $t_j$ and $t_k$; $t_k$ and $t_i$; and $t_i$ and $t_j$, respectively.*

*79. The method of claim 75, wherein said estimated minimum range corresponds to a closest point of approach (CPA) between said first and second points of interest, and wherein said method further comprises using said estimated minimum range at said CPA to estimate a minimum range at a time $t_i$.*

*80. The method of claim 75, wherein said minimum range at said time $t_i$ is equal to said minimum range at said CPA divided by $cos(\theta_0-\theta_i)$, wherein $\theta_0$ is a bearing angle at time $t_0$ and $\theta_i$ is a bearing angle at said time $t_i$.*

*81. The method of claim 14, wherein the vehicle is an aircraft, a water vessel, or an automobile.*

*82. The method of claim 67, wherein the second point of interest is another vehicle.*

*83. The method of claim 67, wherein the second point of interest is a stationary object.*

* * * * *

UNITED STATES PATENT AND TRADEMARK OFFICE

CERTIFICATE OF CORRECTION

PATENT NO. : RE42,546 E
APPLICATION NO. : 11/318398
DATED : July 12, 2011
INVENTOR(S) : Bulow et al.

It is certified that error appears in the above-identified patent and that said Letters Patent is hereby corrected as shown below:

Title page, item (56), under "Other Publications", in Column 1, Line 1, delete "distnace" and insert -- distance --.

Page 2, item (56), under "Other Publications", in Column 1, Lines 1-2, delete "Price et al., Discarding armture and barrel optimiztion or a cannon caliber electomagnetic laucher system, 1994, IEEE, p. 225230.*" and insert -- Price et al., Discarding armature and barrel optimization or a cannon caliber electromagnetic launcher system, 1994, IEEE, p. 225-230.* --.

Page 2, item (56), under "Other Publications", in Column 2, Line 3, delete "powerfulkinematic model for proportionalnavigation" and insert -- powerful kinematic model for proportional navigation --.

Column 10, line 41, in Claim 3, delete "target" and insert -- *target* --.

Column 11, line 7, in Claim 7, delete "formula" and insert -- formula: --.

Column 11, lines 11-13, in Claim 7, delete "[d. generating a representation of the probability of the location of the target] *contact* [located at the minimum range;]" and insert -- "[d. generating a representation of the probability of the location of the target contact located at the minimum range;] --.

Signed and Sealed this
Twenty-second Day of November, 2011

David J. Kappos

David J. Kappos
*Director of the United States Patent and Trademark Office*